Patented June 22, 1926.

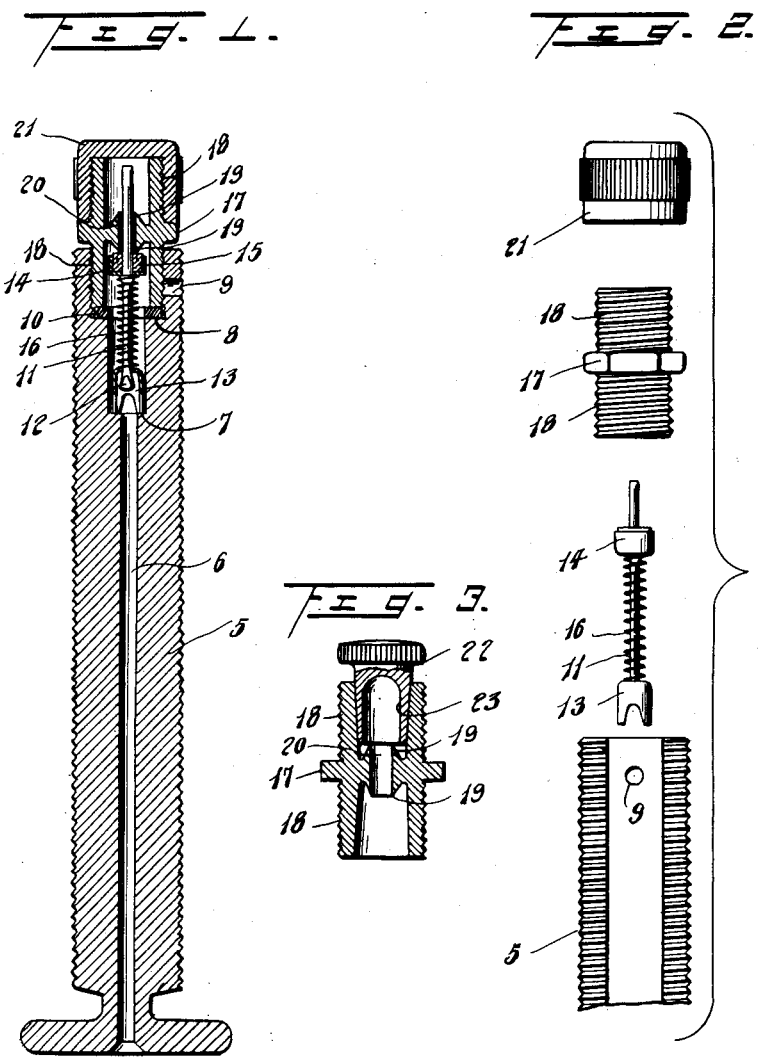

1,589,479

UNITED STATES PATENT OFFICE.

FREDERICK MYERS, OF NEW YORK, N. Y.

PNEUMATIC TIRE VALVE.

Application filed December 2, 1925. Serial No. 72,660.

This invention relates to new and useful improvements in pneumatic tire valves.

The primary object of the invention is the provision of a tire valve which may be quickly and easily assembled or disassembled without necessitating the use of any special form of socket wrench or tool which must operate within the bore of the valve casing.

A further object of the invention is to provide a structure of the above mentioned type, wherein the spring pressed valve member may be positioned within or removed from the bore of the casing without danger of damaging the said valve.

A still further object of the invention is to provide means for permitting rapid deflation of a member equipped with this improved valve structure without removing the spring pressed, inflation and slow deflation valve from its seat or from the valve casing.

And a still further object of the invention is to provide a tire valve structure which includes one element which is of a reversible, compound type, the said element being adapted to function properly in either of the two possible positions in which it may be assembled, and, when in either position, operates as a seat for the spring pressed inflating and slow deflating valve and as a valve for rapid deflating purposes.

Other objects and advantages of the invention will be apparent during the course of the following description.

In the accompanying drawing forming a part of this specification and in which like numerals are employed to designate like parts throughout the same, Figure 1 is a central, longitudinal, sectional view of the pneumatic tire valve structure formed in accordance with this invention, Figure 2 shows in plan view the various independent elements or units employed to build up the complete valve structure and arranged in the sequence in which they are assembled, and Figure 3 is a central sectional view of a modified form of cap.

The principal structural features and the primary advantages derived from the use of this valve may be briefly described as follows:—

The structure includes a suitable valve casing having a bore within which is positioned a spring pressed, inflation and slow deflation valve which is substantially automatic in its operation. The casing is further provided with a port in one side thereof and adjacent its outer end which is employed for the purpose of quickly deflating a pneumatic member equipped with this valve structure. A compound element of a reversible type is suitably connected to the outer end of the valve casing and includes, at each end portion thereof, a valve seat for the spring pressed valve and a valve for controlling the flow of air through the casing port. A suitable cap is provided for preventing the admission of foreign matter into the valve structure and is suitably connected to the outer end of the reversible, compound element.

While this tire valve will be very desirable and convenient for use by a tire owner, it is believed that the tire manufacturer will derive a greater benefit from the same. It is believed unnecessary to enumerate any advantages the user of this structure will derive, but it is thought that a few of the advantages adhering to the manufacturer should be suggested.

To those who are familiar with the various steps performed in the manufacture of a pneumatic tube for vehicle tires, it will be very apparent that a great deal of time and money may be saved during the testing of a completed tube for leaks. It is the custom for tube manufacturers to connect a valve structure to a tube and then inflate the tube so that it may be emersed in a tank of water to test for valve leaks and leaks around the point of connection between the tube and the valve casing. If the Schrader type of valve is employed, it becomes necessary entirely to remove the spring pressed valve element from the bore of the valve casing before the tube may be deflated and quickly packed. This operation must be performed by hand and is not only a tedious step but a great deal of time is lost in carrying out the same. With the improved form of valve structure embodying this invention, approximately three complete turns of the above referred to compound element will uncover or open the port in the valve casing for permitting the tube to be entirely deflated and yet the spring pressed inflating valve has not been removed from its seat or from the bore of the valve casing.

In the drawing, wherein for the purpose of illustration is shown a preferred embodiment of this invention, the numeral 5 designates a valve casing of elongated formation which is externally screw threaded in the ordinary manner for the purpose of accommodating the conventional rim clamping nut and valve casing cap, not shown. The casing is provided with an axially extending bore 6 which is provided with the two spaced shoulders 7 and 8 which are formed by twice increasing the diameter of the bore 6. From the shoulder 8 to the outer end of the casing 5 the bore is internally screw threaded for a purpose to be disclosed as the description proceeds. A port 9 is formed in one side of the casing 5 and communicates with the casing bore adjacent the shoulder 8.

An annular seat 10, formed of any suitable material, is positioned upon the shoulder 8 and functions as a valve seat in a manner to be disclosed at a later point.

A spring pressed, inflation and slow deflation valve unit is positioned within the bore of the casing 5 and includes a valve stem 11 which is flattened at its inner end 12 for retaining upon the stem the cup-like spring seat and stem guide 13 which is movable in respect to the stem. Suitably secured to the stem, intermediate its ends, is a cup 14 which has positioned therein a valve seat 15 which is formed of a suitable, compressible material. Interposed between the element 13 and the fixed element 14 is a spiral spring 16 which encircles the stem 11.

A compound element of a reversible type is threadedly connected to the outer end of the valve stem and it will be seen that the same may be cheaply and easily manufactured from hexagonal or polygonal stock. The compound element includes the wrench engaging portion 17 which is located intermediate the ends of the element, as clearly illustrated. Extending from the portion 17 to each end of the element are the reduced externally screw threaded portions 18. Formed within the bore of this element are the two valve seats 19 which face toward the opposite ends of the element. A suitable passage or bore 20 is formed in this double valve portion.

A suitable cup-like cap 21 is provided and is internally screw threaded to be mounted upon the outer end of the compound member in the manner best illustrated in Figure 1.

Figure 3 shows a modified form of valve cap which is hollow and includes the exterrally knurled head 22 and the tubular, tapered shank 23 which extends into the bore of the projecting, threaded portion 18 of the reversible element. It will be apparent that the cap may be frictionally held in place, as illustrated, or threads or the like may be employed for that purpose.

The method of assembling the various elements and the manner in which they cooperate may be described in detail as follows:—

The annular valve seat 10 should first be positioned upon the shoulder 8 after which the spring pressed, inflation and slow deflation valve may be placed within the casing bore. The compound, reversible element should then be threaded into the outer end of the casing until the inner end edge of the same engages the annular seat 10. The outer end of the valve stem 11 will have passed through the bore 20 formed in the double valve seat portion of the element and the valve seat 19 facing toward the inner end of the compound element will have been placed in engagement with the valve seat 15 to move the stem inwardly in respect to the element 13 for compressing the spring 16 to securely hold the valve 15 against its seat.

It will be noted that no care need be taken in respect to which end of the compound element should be threaded in the bore of the casing in view of the fact that both ends are identical. In inflating a tube equipped with this valve structure, the pump hose may be threaded or otherwise suitably connected to the outer portion 18 of the compound element and air may then be forced through the bore of the casing. If it is desirable to permit the escape of a small portion of air, the outer extremity of the valve stem 11 may be engaged by any suitable means for forcing the valve 15 off its cooperating seat 19. If it is desirable to permit the rapid escape of the air in a tube equipped with this valve structure, it is not necessary to retain the valve 15 off of its seat until the tube is entirely deflated, nor is it necessary to remove the valve 15 from its seat to any extent. The deflating operation may be performed by partially loosening or backing out the compound element in respect to the end of the casing so that the inner end edge of the compound element will be removed from the valve seat 10 and the port 9 opened.

Another novel advantage flowing from the use of this valve structure is the possibility of permtting an air pressure measuring instrument to be used while deflating a too highly inflated tire, for registering the fall in pressure. To accomplish this result, an air gauge should be applied to the outer end 18 of the tubular element, which application will unseat the valve 15. To deflate, the tubular element should be backed away from the packing 10 until the port 9 is opened. It will be apparent that the discharge of air through the port may be positively controlled as to extent and duration, and that immediately upon reaching the desired reduced air pressure, as indicated by the gauge, the discharge may be stopped.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a pneumatic tire valve of the type described, a tubular valve casing, a tubular element, two valve seats in the bore of the tubular element which face toward and are equal distances from the opposite ends of the element, said tubular element being removably mounted with either of its ends projecting into the bore of the tubular casing, and a valve in the casing for cooperating with the valve seat in the bore of the tubular element which faces toward the valve.

2. In a pneumatic tire valve of the type described, the combination with a tubular valve casing, and a stem carried, spring pressed valve positioned therein, of a port in the valve casing, and an element carrying a seat for said valve projecting into the casing and movable to open and close said port.

3. In a pneumatic tire valve of the type described, the combination with a tubular valve casing, a spring pressed valve positioned therein, and a stem carried by the valve, of a port in said casing, and an element carrying an apertured valve seat for said valve projecting into the casing and movable to open and close said port, said valve stem being of a sufficient length to extend through the aperture of said valve seat and to terminate in close proximity to the outer end of the said element.

4. In a pneumatic tire valve of the type described, the combination with a tubular valve casing, and a stem carried spring pressed valve positioned therein, of a port in the valve casing, a tubular element, two valve seats in the bore of the tubular element which face toward and are equal distances from the opposite ends of the element, said element being mounted with either of its ends projecting into the bore of the tubular casing, and movable to open and close said port while the said valve will cooperate with the valve seat which faces toward the same.

In testimony whereof, I affix my signature.

FREDERICK MYERS.